US007006957B2

(12) United States Patent
Doner

(10) Patent No.: US 7,006,957 B2
(45) Date of Patent: Feb. 28, 2006

(54) LOCOMOTIVE PARKING MANAGEMENT TOOL

(75) Inventor: John R. Doner, Melbourne, FL (US)

(73) Assignee: GE Harris Railway Electronics, LLC, Melbourne, FL (US)

(*) Notice: Subject to any disclaimer, the term of this patent is extended or adjusted under 35 U.S.C. 154(b) by 781 days.

(21) Appl. No.: 09/757,833

(22) Filed: Jan. 10, 2001

(65) Prior Publication Data

US 2001/0034642 A1 Oct. 25, 2001

Related U.S. Application Data

(60) Provisional application No. 60/175,479, filed on Jan. 11, 2000.

(51) Int. Cl.
*G06G 7/48* (2006.01)
*G05D 1/00* (2006.01)
*G01C 21/26* (2006.01)

(52) U.S. Cl. .............................. 703/6; 703/22; 701/19; 701/213; 246/2 R; 246/122 R

(58) Field of Classification Search .................. 701/19, 701/20, 202, 207, 209–210, 213, 117; 104/26.1, 104/26.2; 703/6, 22; 246/2 R, 122 R; 700/217; 705/8, 13; 340/988
See application file for complete search history.

(56) References Cited

U.S. PATENT DOCUMENTS 3,861,316 A * 1/1975 Yamazaki et al. ......... 104/26.2
4,610,206 A * 9/1986 Kubala et al. ............. 104/26.1
4,630,216 A 12/1986 Tyler et al.
4,926,343 A 5/1990 Tsuruta et al.
5,623,413 A * 4/1997 Matheson et al. .......... 701/117
6,311,102 B1 * 10/2001 Minakami ................... 700/217
6,377,877 B1 * 4/2002 Doner ......................... 701/19
6,405,127 B1 * 6/2002 Doner ........................ 701/207
6,446,912 B1 * 9/2002 Barich et al. ............... 246/2 R
6,456,937 B1 * 9/2002 Doner et al. ................ 701/213
2001/0044681 A1 * 11/2001 Diana et al. .................. 701/19

FOREIGN PATENT DOCUMENTS

DE 195 05 223 A 1 8/1996
EP 0 721 872 A2 7/1996

OTHER PUBLICATIONS

Sarosky et al., T. Simulation of a Railroad Intermodel Terminal, Proceedings of the 26th winter Simulation Conference, Dec. 1994, pp. 1233-1238.*
International Search Report.

* cited by examiner

*Primary Examiner*—Russell Frejd
(74) *Attorney, Agent, or Firm*—Armstrong Teasdale LLP

(57) ABSTRACT

A system for managing locomotives in a railyard including a parking yard and a service yard, based on possible future states of the parking yard and the service yard. The system includes a computer and utilizes an algorithm that enumerates possible present locomotive placement options, enumerates possible future railyard states arising from each possible present locomotive placement option, examines each possible future railyard state, and determines a present option based on the examination of the possible future railyard states.

31 Claims, 3 Drawing Sheets

LOCOMOTIVE PARKING MANAGEMENT TOOL

CROSS REFERENCE TO RELATED APPLICATIONS

This application claims the benefit of U.S. Provisional application No. 60/175,479, filed Jan. 11, 2000, which is hereby incorporated by reference in its entirety.

BACKGROUND OF THE INVENTION

This invention relates generally to railyards, and more particularly to locomotive parking and servicing management within a railyard.

Most railyards must store incoming locomotives between assignments to trains, and many railyards also carry out service operations on locomotives. Both the parking and/or servicing of locomotives can affect the time at which they will be ready for service on an outbound train, so parking and service decisions can materially affect the overall performance of a railyard. In general, it is recognized that railyard management would benefit from the use management tools based on optimization principles. Such tools use a current railyard status and list of future tasks to be accomplished to determine an optimum order in which to accomplish these tasks such that railyard management objectives and rules are fulfilled.

As used herein, the term “locomotive consist” or “consist” means one or more locomotives physically connected together, with one locomotive designated as a lead locomotive and other locomotives designated as remote locomotives. The term “train consist” means one or more locomotives and one or more railcars physically connected together.

Railyards must store locomotives temporarily, when inbound or terminating trains are disassembled. The locomotives are parked in the yard, and placed back into service later as needed. Many yards include a locomotive service shop, and inbound locomotives therefore fall into one of four classifications: assigned to a later outbound train, needing no service, unassigned, and needing no service, assigned to a later outbound train, and needing service, and unassigned, and needing service. Depending on the locomotive’s status and the schedule of inbound and outbound trains, a given locomotive may need to remain in the yard for a short while, or for a long time. The parking arrangement for locomotives should, if possible, accommodate the easy retrieval of locomotives at the time they must be moved, but limited parking facilities generally complicate the situation.

A typical parking arrangement for a railyard, comprises a collection of parallel tracks and a locomotive shop, located side-by-side. There is usually a direction of flow through the railyard with locomotives normally arriving at the parking complex, and later being pulled for service from the parking complex. However, an arriving locomotive will frequently be parked behind other locomotives, and if it is needed before one of those which precede it in the queue, then additional locomotives must be temporarily displaced in order to free the needed one. This represents an inefficiency, both in terms of time delay and labor hours needed to perform the extra activities.

Another inefficiency arises if locomotives slated for service are parked in a poor order. For example, a locomotive requiring 30 minutes of service, and slated for outbound use three hours later may be parked behind a locomotive requiring four hours of service. In order to meet schedule, the obstructing locomotive must be moved, again resulting in delay and cost in hostler hours.

There exists a need for a locomotive parking management scheme to ameliorate the inefficiencies which arise in any given parking/service configuration. As locomotives arrive, there will be several options available for parking them, either for use or for service. A desirable parking management scheme is one which is capable of weighing the cost of various parking options against the future locomotive requirements of the yard.

BRIEF SUMMARY OF THE INVENTION

In one embodiment, a system for managing locomotives in a railyard including a storage or parking yard and a service yard, determines an optimal configuration of locomotive within a railyard, based on possible future states of the parking yard and the service yard. The system includes a computer and utilizes an algorithm that enumerates possible present locomotive placement options, enumerates possible future railyard states arising from each possible present locomotive placement option, examines each possible future railyard state, and determines a present option based on the examination of the possible future railyard states.

More specifically, the system establishes an initial state of the railyard by evaluating a geometry of the parking yard and the service yard, and evaluating a present configuration of locomotives in the parking and service yards. The system then enumerates possible future railyard states based on evaluation of the initial railyard state and a yard schedule, which includes an inbound locomotive schedule and an outbound locomotive schedule. Additionally, locomotive service requirements and non-standard movements are considered when enumerating possible future railyard states. Next the system examines each possible future railyard state wherein a cost and a time-based efficiency of each possible future state is calculated. The cost and efficiency calculation considers the effect of railyard operations such as, the cost and time delay caused by locomotive service requirements, and the cost and delay of non-standard locomotive movements.

Finally, the system determines a present locomotive placement option by applying specific railyard locomotive management objectives and rules, and selecting the present placement option that will provide future states that most closely fulfill the management objectives and rules. The management objectives include such things as, assembling an outbound train as scheduled, delivering the outbound train as schedule, reducing labor involved in assembling and delivering the outbound train, and reducing delays in locomotive servicing.

The management rules include parking yard management rules such as executing locomotive pull-forwards when there is a reduced number of locomotives on an affected track, maintaining an order of locomotives on each parking track such that locomotives for later outbound locomotive consists are parked behind locomotives for earlier outbound locomotive consists, and parking a lead locomotive for an outbound locomotive consist on a parking track such that the lead locomotive is in front of other locomotives parked on the same track that are allocated for the same outbound locomotive consist. Additionally, the management rules include service yard management rules such as positioning a locomotive in a queue for service on a lead-in track to a service bay that provides the appropriate service, positioning locomotives in queue on a lead-in track in an order that allows servicing of each locomotive to be completed before each locomotive is scheduled for assembly in an outbound locomotive consist, and scheduling short service activities before long service activities when scheduling conflicts are not at issue.

Thus, the system enumerates possible present locomotive placement options, examines possible future railyard states that result from each option, and processes incoming locomotives based on the placement option having future states that fulfill the railyard management objectives and rules.

DETAILED DESCRIPTION OF THE INVENTION

Figure 1:
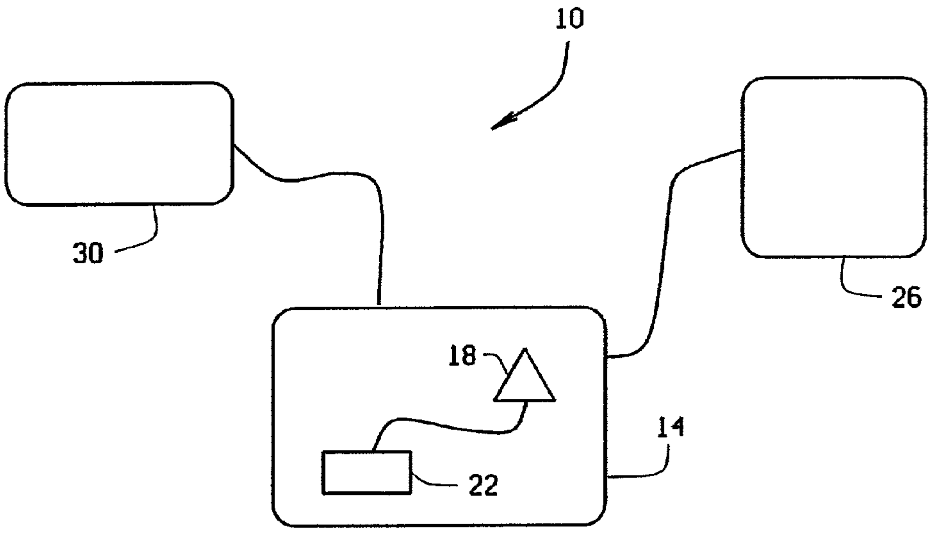
FIG. 1 is a schematic of a locomotive management system for managing locomotive parking in a railyard in accordance with one embodiment of the present invention.

FIG. 1 is a schematic of a locomotive managing system 10 for managing locomotives in railyard in accordance with one embodiment of the present invention. System 10 includes a computer 14, which includes a processor 18 suitable to execute all functions of computer 14, and an electronic storage device 22 for storing programs, information and data. Additionally, computer 14 is connected to a display 26 for viewing information, data, and graphical representations, and an user interface 30 that allows a user to input information, data, and queries to computer 14, for example a keyboard or a mouse.

Figure 2:
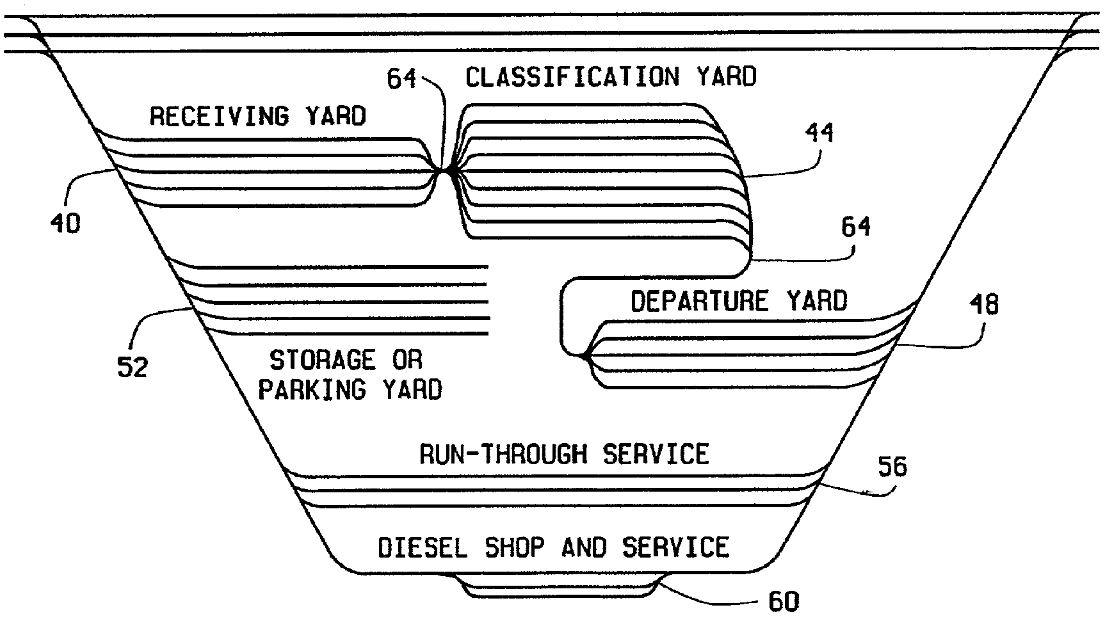
FIG. 2 is a diagram of a railyard for illustrating the various areas of the railyard locomotives pass through during processing utilizing the system shown in FIG. 1.

FIG. 2 is a diagram of a railyard layout for illustrating particular railyard activities for which locomotive managing system 10 (shown in FIG. 1) is utilized. A railyard includes various sets of tracks dedicated to specific uses and functions. For example, an incoming train consist arrives in a receiving yard 40 and is assigned a specific receiving track. Then at some later time, a switch engine enters the track and moves the railcars into a classification area, or bowl, 44. The tracks in classification yard 44 are likewise assigned to hold specific blocks of railcars being assembled for outbound trains. When a block of railcars is completed it is assigned to a specific track in a departure yard 48 reserved for assembling a specific outgoing train. When all the blocks of railcars for the departing train are assembled, one or more locomotives from a locomotive storage or parking yard 52 will be moved and coupled to the assembled railcars. A railyard also includes a service run through area 56 for servicing railcars, and a diesel shop and service area 60 to service and repair locomotives. The organization of yards normally includes a number of throats, or bottlenecks 64, through which all cars involved in the train building process (TBP) must pass. Throats 64 limit the amount of parallel processing possible in a yard, and limit the rate at which the sequence of train building tasks may occur.

In one embodiment, locomotive managing system 10 manages locomotives in a railyard based on possible future states of the yard. To begin, system 10 (shown in FIG. 1) establishes an initial state of the railyard by evaluating a geometry of the parking yard and the service yard, and evaluating a present configuration of locomotives in the parking and service yards. A locomotive parking management process must proceed from the initial state where locomotives are in the railyard and occupy positions in parking yard 52, positions in service area 60 and other tracks associated with service area 60. The occupancy of any parking or service facility at the moment of management initiation constitutes the initial state of system 10 from which all future locomotive parking and servicing proceeds. Each locomotive present in parking yard 52 or service area 60 at the initial state is designated for a future purpose, and each locomotive in service area 60 is additionally designated with a remaining service time. The designated future purpose of each locomotive is derived from a yard schedule. The yard schedule, as it affects locomotive flow, comprises an inbound schedule that identifies the locomotives arriving on an inbound train consist, and an outbound schedule that identifies which outbound train consist to which each locomotive is assigned. The inbound schedule also stipulates whether a locomotive requires service or repair prior to being assembled in an outbound train consist, and what service delay is expected.

Figure 3:
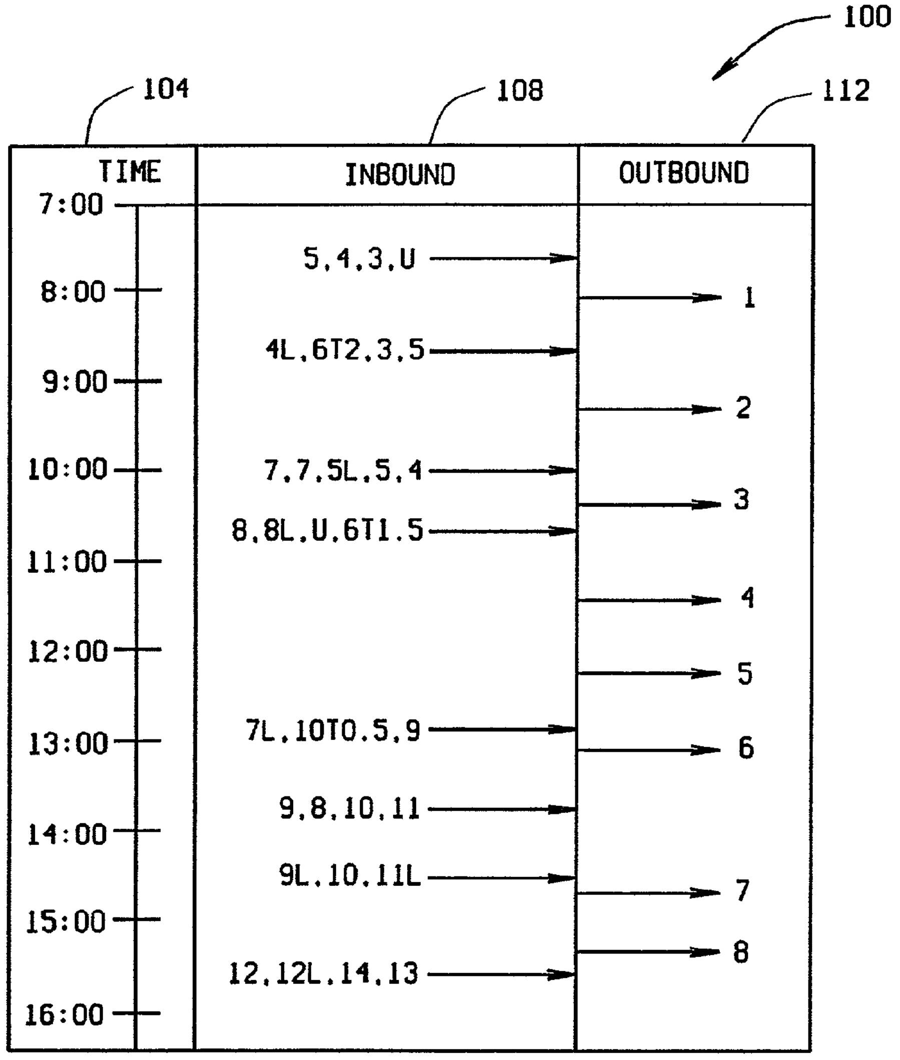
FIG. 3 is a graphical illustration of an exemplary yard schedule for locomotives utilized by the system shown in FIG. 1.

FIG. 3 is a graphical illustration 100 depicting an exemplary yard schedule for locomotives utilized by system 10 (shown in FIG. 1). Time scale 104 divides a nine hour span of time into one hour increments, inbound column 108 contains alphanumerics indicating the disposition of each locomotive of an inbound train consist, and outbound column 112 designates outbound train consists in which locomotives shown inbound column 108 are assigned. The outbound train consists enumerated in outbound column 112 are located so that time scale 104 indicates their time of departure. The designations applying to inbound column 108 are,

| | |
|---|---|
| 1) integer value only | assigned to outbound train of the same number; |
| 2) integer followed by an "L" | lead locomotive for the designated outbound train; |
| 3) a "U", only | presently has no outbound assignment; |
| 4) "TX" suffix to above designations | requires X hours of service of type T. |

Thus, FIG. 3 depicts an exemplary situation confronting a locomotive manager with respect to locomotive parking, service, and timely retrieval.

As inbound train consists arrive at the railyard locomotive parking decisions must be made. In one embodiment, the locomotive parking process utilizes the following guidelines, 1) the arriving locomotives of an inbound train may be parked in any order;
2) an arriving locomotive to be parked may be placed on either end of any parking or service track;
3) arriving locomotives requiring service need not be immediately placed in an appropriate service queue;
4) locomotives, which must be moved to free others, can be re-parked in any available locations.

Given the initial state of system 10, the inbound schedule, the outbound schedule, and the parking options, the locomotive manager is confronted with providing parking and facilitating service, as needed, for all locomotives present in the yard, and doing so in a manner which meets the following locomotive management constraints, 1) all outbound power consists can be assembled and delivered to outbound trains as scheduled;
2) the total labor (man-hours) involved in parking and building power consists is minimized;
3) locomotive service delay is minimized;
4) when Constraint I above cannot be met, a cost comparison between late train departures and yard labor costs can be used to decide if extraordinary action should be taken.

Referring to FIG. 1, during application of the locomotive management process system 10 implements a parking management algorithm utilizing computer 14. The algorithm is stored on storage device 22 and executed using processor 18. The parking management algorithm utilizes the initial state of system 10, the inbound schedule, the outbound schedule, and the parking options, then combines the locomotive management constraints in a way that provides a single metric by which parking decisions are assessed. In an alternate embodiment, depending on yard specifics or short-term contingencies, other locomotive management constraints also apply.

Typically, locomotive parking does not follow an ideal FIFO (first-in, first-out) flow through parking yard 52 and service area 60, and the parking arrangement, at the expense of extra man-hours of labor, is not ideal. For example, at some extra expense in labor and time, an inbound locomotive may need to be pulled around parking tracks in parking yard 52 and parked at the front of a parking track. Such a move might well justify the extra cost if in fact that locomotive is needed before some of the other locomotives already on the same parking track. Furthermore, to avoid extra labor costs for arranging the order of a power consist, a lead locomotive is best placed in front of the other locomotives for the same outgoing train.

However, there are unavoidable minimum labor requirements for moving locomotives to parking yard 52, and placing them in the input end of the parking or service tracks. Thus, when deviations occur from the FIFO order the parking management process trades off costs of alternate parking arrangements. Such out-of-the-ordinary moves as referred to as non-standard moves (NSM's). Each of NSM has a cost in man-hours of labor, based on the actual yard geometry. In one embodiment, the following actions are regarded as NSM's, and subject to extra costs, 1) a "pull-around", when an incoming locomotive is placed in front of already parked locomotives;
2) a "pull-forward", when a collection of locomotives is pulled forward (remaining in the same order) on a parking track;
3) a "repark", when locomotives must be pulled from in front of a needed locomotive, and then returned to parking;
4) a "consist reordering", where a lead locomotive has been parked behind other locomotives intended for the same consist;
5) a "service initiation move", where a locomotive is moved from a previous parking spot to a service input track;
6) a "service completion move", where a locomotive completing service cannot be left on the service output track outside the shop, so must be reparked in some other location.

In an alternate embodiment the NSM's and related cost structure vary depending the particular layout of the railyard and conflicts with other railyard activities.

In addition to the initial state, the inbound schedule, the outbound schedule, and the parking options, the parking management algorithm utilizes the cost in man-hours and dollars associated with NSM's, delays associated with NSM, cost in man-hours and dollars associated with the delays, a list of service types provided by the diesel shop, and a cost in dollars associated with an outbound train consist not departing on time.

After the initial state, yard schedule, costs of NSM's, and the other information utilized by the parking management algorithm are determined, system 10 enumerates possible future railyard states based on evaluation of the initial railyard state and a yard schedule. Next system 10 examines each possible future railyard state wherein a cost and a time based efficiency of each possible future state is calculated.

Finally, the parking management algorithm optimizes costs and efficiency of each future state and determines an optimal present locomotive placement option. The optimal placement option is determined by comparing the costs of NSM's with the costs of delayed locomotive consist departure, by applying specific railyard locomotive management objectives and rules, and selecting the present placement option that will provide future states that the most closely fulfills the management objectives and rules. In one embodiment, management objectives include such things as, assembling an outbound train as scheduled, delivering the outbound train as scheduled, reducing labor involved in assembling and delivering the outbound train, and reducing delays in locomotive servicing. Thus, the parking decisions at any moment are based on an assessment of future state, utilizing specific criteria to sort through current parking options, both present and future, in order to assess the sum of immediate and future parking costs.

In an exemplary embodiment, management rules include parking yard management rules and service yard management rules. The parking yard management rules include such things as executing locomotive pull-forwards when there is a reduced number of locomotives on an affected track, maintaining an order of locomotives on each parking track such that locomotives for later outbound locomotive consists are parked behind locomotives for earlier outbound locomotive consists, and parking a lead locomotive for an outbound locomotive consist on a parking track such that the lead locomotive is in front of other locomotives parked on the same track that are allocated for the same outbound locomotive consist.

Locomotives due for service create a separate queuing problem, which is jointly handled with locomotive parking. As in the case of parking, the order in which locomotives are serviced affects the time at which they are available, and the general process of queuing them before and after service entails some inefficiencies. For example, a service shop may or may not have multiple bays, and the bays may or may not be served by separate lead-in tracks and separate tracks at the output of the shop. Thus, service yard management rules for making decisions as to order of service will be very specific to the service and parking facilities of a given yard. In an exemplary embodiment, the service yard management rules include such things as positioning a locomotive in a queue for service on a lead-in track to a service bay that provides the appropriate service, positioning locomotives in queue on a lead-in track in an order that allows servicing of each locomotive to be completed before each locomotive is scheduled for assembly in an outbound locomotive consist, and scheduling short service activities before long service activities when scheduling conflicts are not at issue. In other embodiments, other service yard management rules apply, based on the specifics of the service shop and railyard.

In order to determine an optimal present locomotive placement option, the locomotive parking management algorithm must evaluate each possible future parking configuration. In one embodiment, the algorithm applies a simple branching process, beginning with an enumeration of all possible present options, and then examining all possible future states, which might arise from each present option.

For example, if a railyard has four incoming locomotives and ten available parking slots there are, $N(1)=14!/(4!10!)=1001$ possible parking arrangements.

If one of these parking arrangements is selected, and later two locomotives are assembled in an outbound train, and three more locomotives arrive with a second inbound train. Then at this time there will be, $N(2)=12!/(3!9!)=220$ possible parking arrangements.

Furthermore, if a second outbound train departs, the next sequence of four incoming locomotives gives rise to, $N(3)=14!/(4!10!)=1001$ possible parking arrangements.

Therefore, considering all possible parking arrangements for the first three inbound trains, the locomotive parking management algorithm must evaluate, $(1001)(1001)(220)=220,440,220$ possible combinations.

There are many possible techniques that are applicable to calculate the number of possible future states. The branching process shown above is by way of example only, and is not intended to limit the possible techniques used by the locomotive parking management algorithm to evaluate future states.

Figure 4:
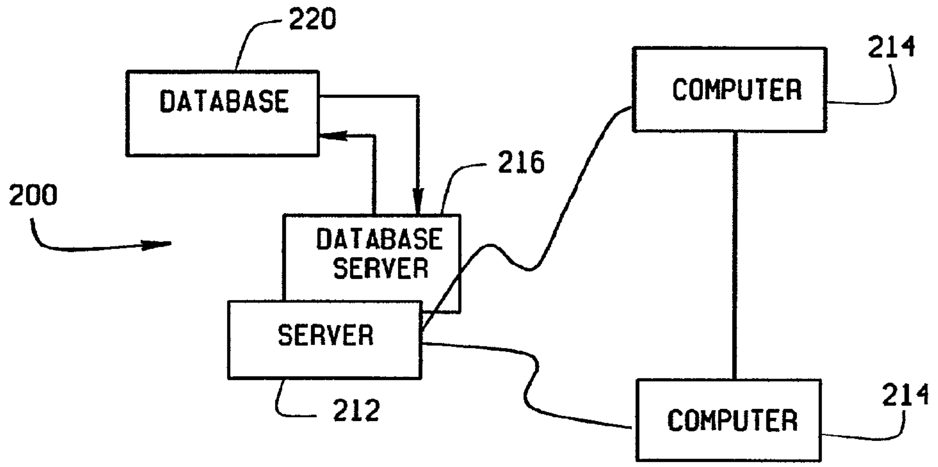
FIG. 4 is a simplified block diagram of a server system for managing locomotive parking in a railyard, used in conjunction with the system shown in FIG. 1.

FIG. 4 is a simplified block diagram of a server system 200 for managing locomotive in a railyard, used in conjunction with the system shown in FIG. 1. In an alternate embodiment, computer 14 (shown in FIG. 1) is part of a computer network accessible using the Internet. System 200 includes a server system 212 and a plurality of client systems 214 connected to server system 212. In one embodiment, client systems 214 are computers, such as computer 14 (shown in FIG. 1), including a web browser, such that server system 212 is accessible to client systems 214 via the Internet. Client systems 214 are interconnected to the Internet through many interfaces including a network, such as a local area network (LAN) or a wide area network (WAN), dial-in-connections, cable modems and special high-speed ISDN lines. Client systems 214 could be any device capable of interconnecting to the Internet including a web-based phone or other web-based connectable equipment. A database server 216 is connected to a centralized database 220 containing product related information on a variety of products, as described below in greater detail. In one embodiment, centralized database 220 is stored on server system 212 and can be accessed by potential users at one of client systems 214 by logging on to server system 212 through one of client systems 214. In an alternative embodiment centralized database 220 is stored remotely from server system 212.

Figure 5:
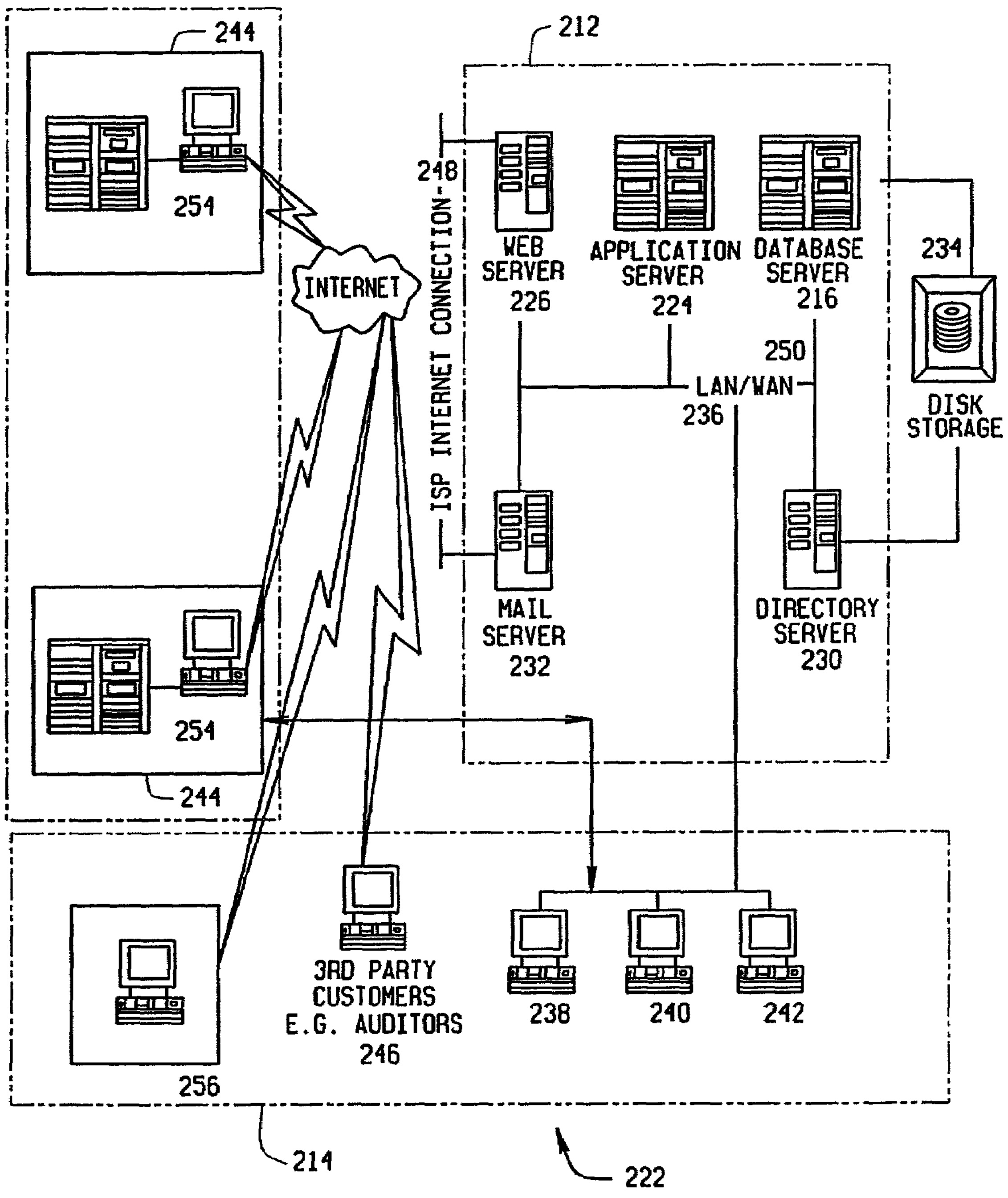
FIG. 5 is an expanded version block diagram of an alternate embodiment of a server architecture for managing locomotive parking in a railyard, used in conjunction with the system shown in FIG. 1.

FIG. 5 is an expanded version block diagram of an alternate embodiment of a server architecture 222 for managing locomotive parking in a railyard, used in conjunction with the system shown in FIG. 1. Components in system 222, identical to components of system 200 (shown in FIG. 4), are identified in FIG. 5 using the same reference numerals as used in FIG. 4. System 222 includes server system 212 and client systems 214. Server system 212 further includes database server 216, an application server 224, a web server 226, a directory server 230, and a mail server 232. A disk storage unit 234 is coupled to database server 216 and directory server 230. Servers 216, 224, 226, 230, and 232 are coupled in a local area network (LAN) 236. In addition, a system administrator's workstation 238, a user workstation 240, and a supervisor's workstation 242 are coupled to LAN 236. Alternatively, workstations 238, 240, and 242 are coupled to LAN 236 via an Internet link or are connected through an Intranet.

Each workstation, 238, 240, and 242 is a personal computer having a web browser. Although the functions performed at the workstations typically are illustrated as being performed at respective workstations 238, 240, and 242, such functions can be performed at one of many personal computers coupled to LAN 236. Workstations 238, 240, and 242 are illustrated as being associated with separate functions only to facilitate an understanding of the different types of functions that can be performed by individuals having access to LAN 236.

In another embodiment, server system 212 is configured to be communicatively coupled to various individuals or employees 244 and to third parties, e.g., internal or external auditors, 246 via an ISP Internet connection 248. The communication in the exemplary embodiment is illustrated as being performed via the Internet, however, any other wide area network (WAN) type communication can be utilized in other embodiments, i.e., the systems and processes are not limited to being practiced via the Internet. In addition, and rather than a WAN 250, local area network 36 could be used in place of WAN 250.

In the exemplary embodiment, any authorized individual or an employee of the business entity having a workstation 254 can access the locomotive management system. One of the client systems includes a workstation 256 located at a remote location. Workstations 254 and 256 are personal computers having a web browser. Also, workstations 254 and 256 are configured to communicate with server system 212.

While the invention has been described in terms of various specific embodiments, those skilled in the art will recognize that the invention can be practiced with modification within the spirit and scope of the claims.

What is claimed is:

1. A method for managing locomotives in a railyard including a parking yard and a service yard, based on possible future states of the parking yard and the service yard, using a system including a computer, said method comprising the steps of:

establishing an initial state of the locomotives in the parking yard and the service yard;

enumerating possible present locomotive railyard parking options;

enumerating possible future railyard parking configurations arising from each possible present locomotive railyard parking option;

examining each possible future railyard parking configuration;

determining a metric for parking decisions using the initial state of the locomotives in the parking yard and the service yard. an inbound schedule that identifies the locomotives arriving on an inbound train consist, an outbound schedule that identifies which outbound train consist to which each locomotive is assigned, and the possible railyard parking options: and choosing a resent locomotive railyard parking option based on the examination of the possible future railyard parking configurations and the metric.

2. A method in accordance with claim 1 wherein said step of enumerating possible present locomotive railyard parking options comprises the steps of:

evaluating a geometry of the parking yard; and evaluating a geometry of the service yard.

3. A method in accordance with claim 1 wherein said step of establishing an initial state of the locomotives in the parking yard and the service yard comprises the steps of:

evaluating a present locomotive configuration of the parking yard; and evaluating a present locomotive configuration of the service yard.

4. A method in accordance with claim 1 wherein said step of enumerating possible future railyard parking configurations comprises the steps of:

evaluating the initial railyard state; and evaluating a yard schedule.

5. A method in accordance with claim 4 wherein said step of evaluating a yard schedule comprises the steps of:

evaluating an inbound locomotive schedule; and evaluating an outbound locomotive schedule.

6. A method in accordance with claim 5 wherein said step of evaluating a yard schedule further comprises the steps of:

evaluating service requirements of inbound locomotives;

evaluating a list of locomotive service types provided in the service yard; and evaluating non-standard movements of locomotives within the railyard.

7. A method in accordance with claim 1 wherein said step of examining each possible future railyard state comprises the steps of:

examining a cost of each possible future state; and examining a time based efficiency of each possible state.

8. A method in accordance with claim 7 wherein said step of examining a cost of each possible future state comprises the steps of:

examining costs incurred from delays to the outbound locomotive schedule caused by the service requirements;

examining costs incurred in performing non-standard movements;

examining costs incurred by schedule delays caused by non-standard movements; and examining costs incurred by late departure of a locomotive.

9. A method in accordance with claim 7 wherein said step of examining a time based efficiency of each possible state comprises the steps of:

examining delays to an outbound locomotive schedule caused by the service requirements; and examining delays caused by non-standard movements.

10. A method in accordance with claim 1 wherein said step of choosing a present option comprises the step of executing a locomotive management algorithm utilizing the computer.

11. A method in accordance with claim 10 wherein said step of executing a locomotive management algorithm comprises the steps of:

applying a set of yard management objectives;

applying a set of parking yard management rules; and applying a set of service yard management rules.

12. A method in accordance with claim 11 wherein said step of applying a set of yard management objectives comprises the steps of:

assembling an outbound locomotive consist as scheduled;

delivering an outbound locomotive consist as scheduled;

reducing a total labor usage figure for labor involved in assembling and delivering an outbound locomotive consist;

reducing delays in locomotive servicing; and comparing the cost of late locomotive consist departure to additional labor costs needed to assemble and deliver an outbound locomotive consist as scheduled.

13. A method in accordance with claim 11 wherein said step of applying a set of parking yard management rules comprises the steps of:

executing locomotive pull-forwards when there is a reduced number of locomotives on an affected parking track;

maintaining an order of locomotives on each parking track such that locomotives for later outbound locomotive consists are parked behind locomotives for earlier outbound locomotive consists; and parking a lead locomotive for an outbound locomotive consist on a parking track such that the lead locomotive is in front of other locomotives parked on the same track that are allocated for the same outbound locomotive consist.

14. A method in accordance with claim 11 wherein said step of applying a set of service yard management rules comprises the steps of:

positioning a locomotive in a queue for service on a lead-in track to a service bay that provides the appropriate service;

positioning locomotives in a queue on a lead-in track in an order that allows servicing of each locomotive to be completed before each locomotive is scheduled for assembly in an outbound locomotive consist; and scheduling short service activities before long service activities when scheduling conflicts are not at issue.

15. A networked system for managing locomotives in a railyard including a parking yard and a service yard, based on possible future states of the parking yard and the service yard, said system comprising:

a client system comprising a browser;

a database for storing information;

a server system coupled to said client system and said database, said server system configured to:

establish an initial state of the locomotives in the parking yard and the service yard;

enumerate possible present locomotive railyard parking options;

enumerate possible future railyard parking configurations arising from each possible present locomotive railyard parking option;

examine each possible future railyard state parking configurations;

determine a metric for parking decisions using the initial state of the locomotives in the parking yard and the service yard. an inbound schedule that identifies the locomotives arriving on an inbound train consist, an outbound schedule that identifies which outbound train consist to which each locomotive is assigned, and parking options; and determine a present option based on the examination of the possible future railyard states and the metric.

16. A networked system in accordance with claim 15 wherein to enumerate possible present locomotive railyard parking options said server system further configured to:

evaluate a geometry of the parking yard; and evaluate a geometry of the service yard.

17. A networked system in accordance with claim 16 wherein to establish an initial state of the locomotives in the parking yard and the service yard said server system further configured to:

evaluate a present locomotive configuration of the parking yard; and evaluate a present locomotive configuration of the service yard.

18. A networked system in accordance with claim 16 wherein to enumerate possible future railyard parking configurations said server system further configured to:

evaluate the initial railyard state; and evaluate a yard schedule.

19. A networked system in accordance with claim 18 wherein to evaluate a yard schedule said server system further configured to:

evaluate an inbound locomotive schedule; and evaluate an outbound locomotive schedule.

20. A networked system in accordance with claim 19 wherein to evaluate a yard schedule said server system further configured to:

evaluate service requirements of inbound locomotives;

evaluate a list of locomotive service types provided in the service yard; and evaluate non-standard movements of locomotive within the railyard.

21. A networked system in accordance with claim 15 wherein to examine each possible future railyard state said server system further configured to:

examine a cost of each possible future state; and examine a time based efficiency of each possible state.

22. A networked system in accordance with claim 21 wherein to examine a cost of each possible future state said server system further configured to:

examine a cost of delays to the outbound locomotive schedule caused by the service requirements; and examine a cost of non-standard movements.

23. A networked system in accordance with claim 21 wherein to examine a time based efficiency of each possible state said server system further configured to:

examine costs incurred from delays to the outbound locomotive schedule caused by the service requirements;

examine costs incurred in performing non-standard movements;

examine costs incurred by schedule delays caused by non-standard movements; and examine costs incurred by late departure of a locomotive.

24. A networked system in accordance with claim 15 further configured to execute a locomotive management algorithm by:

applying a set of yard management objectives;

applying a set of parking yard management rules; and applying a set of service yard management rules.

25. A networked system in accordance with claim 24 wherein to apply a set of yard management objectives said server system further configured to:

assemble an outbound locomotive consist as scheduled;

deliver an outbound locomotive consist as scheduled;

reduce a total labor usage figure for labor involved in assembling and delivering a locomotive consist;

reduce delays in locomotive servicing; and compare the cost of late locomotive consist departure to additional labor costs needed to assemble and deliver an outbound locomotive consist as scheduled.

26. A networked system in accordance with claim 24 wherein to apply a set of parking yard management rules said server system further configured to:

execute locomotives pull-forwards when there is a reduced number of locomotives on an affected parking track;

maintain an order of locomotives on each parking track such that locomotives for later outbound locomotive consists are parked behind locomotives for earlier outbound locomotive consists; and park a lead locomotive for an outbound locomotive consist on a parking track such that the lead locomotive is in front of other locomotives parked on the same track that are allocated for the same outbound locomotive consist.

27. A networked system in accordance with claim 24 wherein to apply a set of service yard management rules said server system further configured to:

position a locomotive in a queue for service on a lead-in track to a service bay that provides the appropriate service;

position locomotives in a queue on a lead-in track in an order that allows servicing of each locomotive to be completed before each locomotive is scheduled for assembly in an outbound locomotive consist; and schedule short service activities before long service activities when scheduling conflicts are not at issue.

28. A networked system according to claim 15 wherein the client system and the server system are connected via a networked and wherein the network is one of a wide area network, a local area network, and an Intranet and the Internet.

29. A networked system according to claim 15 wherein said server system is further configured with a displaying component for displaying various user interfaces to the user, a receiving component for receiving an inquiry to provide information from one of a plurality of users, a collection component for collecting information from users into the centralized database, a tracking component for tracking information on an on-going basis, and an accessing component for accessing the centralized database and causing the retrieved information to be displayed on the client system.

30. A networked system according to claim 29 wherein said server system further configured with a processing component for searching and processing received inquiries against the data storage device containing a variety of information collected by the collection component.

31. A networked system according to claim 29 wherein said server system further configured with a retrieving component to retrieve information from the data storage device.

* * * * *